US009395387B1

(12) United States Patent
Ohta

(10) Patent No.: US 9,395,387 B1
(45) Date of Patent: Jul. 19, 2016

(54) SCANNING PROBE MICROSCOPE

(71) Applicant: SHIMADZU CORPORATION, Kyoto-shi, Kyoto (JP)

(72) Inventor: Masahiro Ohta, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/744,216

(22) Filed: Jun. 19, 2015

(51) Int. Cl.
G01Q 20/02 (2010.01)
G01Q 60/30 (2010.01)
G01Q 20/00 (2010.01)
G01Q 10/00 (2010.01)
B82Y 25/00 (2011.01)
B82Y 35/00 (2011.01)

(52) U.S. Cl.
CPC ............... *G01Q 20/00* (2013.01); *B82Y 25/00* (2013.01); *B82Y 35/00* (2013.01); *G01Q 10/00* (2013.01)

(58) Field of Classification Search
CPC ........ B82Y 35/00; B82Y 25/00; G01Q 10/00; G01Q 10/065; G01Q 20/02; G01Q 40/00; G01Q 60/30; G01Q 30/025; Y10S 977/86; Y10S 977/849; Y10S 977/868; Y10S 977/87; Y10S 977/881
USPC ............ 850/1, 5, 6, 10, 19, 52; 977/852, 851, 977/860, 849, 868, 870
See application file for complete search history.

(56) References Cited

U.S. PATENT DOCUMENTS 5,260,824 A * 11/1993 Okada .................... B82Y 35/00
359/368
5,652,377 A * 7/1997 Yagi ....................... B82Y 35/00
73/105
6,005,246 A * 12/1999 Kitamura ............... B82Y 35/00
73/105
6,006,593 A * 12/1999 Yamanaka ............. B82Y 35/00
73/105
6,073,485 A * 6/2000 Kitamura ............... B82Y 35/00
73/105
6,281,495 B1 * 8/2001 Kitamura ............... B82Y 35/00
250/307
6,489,611 B1 * 12/2002 Aumond ................. B82Y 35/00
250/307
6,605,941 B2 * 8/2003 Abe ....................... B82Y 35/00
324/210
6,935,167 B1 * 8/2005 Sahin ..................... B82Y 35/00
73/105
6,945,099 B1 * 9/2005 Su .......................... B82Y 35/00
73/105

(Continued)

FOREIGN PATENT DOCUMENTS

JP 2008-122168 A 5/2008

*Primary Examiner* — David A Vanore
(74) *Attorney, Agent, or Firm* — Sughrue Mion, PLLC

(57) ABSTRACT

A scanning probe microscopes including an imaging device (optical microscope) which images the cantilever, a device is provided which estimates the resonance frequency of the cantilever from the cantilever image imaged by the imaging device, as a result of which, even when information on the cantilever is unknown, the cantilever is actually excited to perform measurement of resonance frequency within a specified frequency range centered on the estimated resonance frequency, thereby enabling measurement of resonance frequency within an appropriate frequency range and making it possible to avoid obtaining an incorrect resonance frequency and to eliminate the waste of performing resonance frequency measurements while changing the frequency range settings in trial-and-error fashion.

14 Claims, 4 Drawing Sheets

(56) References Cited

U.S. PATENT DOCUMENTS

| | | | | |
|---|---|---|---|---|
| 7,387,016 B2 * | 6/2008 | Nakamoto | B82Y 35/00 73/105 |
| 7,627,438 B1 * | 12/2009 | Salapaka | B82Y 35/00 702/127 |
| 7,975,316 B2 * | 7/2011 | Ota | B82Y 35/00 73/105 |
| 8,490,209 B2 * | 7/2013 | Saito | G01Q 60/54 850/12 |
| 8,887,311 B1 * | 11/2014 | Kirishima | G01Q 20/02 850/5 |
| 9,297,827 B2 * | 3/2016 | Proksch | G01Q 10/00 |
| 2010/0043107 A1 * | 2/2010 | Proksch | G01Q 60/24 850/40 |
| 2013/0117895 A1 * | 5/2013 | Proksch | G01Q 10/00 850/1 |
| 2014/0223614 A1 * | 8/2014 | Fukuma | B82Y 35/00 850/1 |
| 2015/0309071 A1 * | 10/2015 | Proksch | G01Q 40/00 850/1 |

* cited by examiner

SCANNING PROBE MICROSCOPE

TECHNICAL FIELD

The present invention relates to a scanning probe microscope; more specifically, the invention relates to a scanning probe microscope which performs measurement by scanning a sample surface while causing a cantilever comprising a probe to vibrate at a frequency near the resonance point.

BACKGROUND ART

Scanning probe microscopes (SPMs), such as atomic force microscopes (AFMs), are widely used for observing fine irregularities of a sample surface and measuring surface roughness. One observation technique for such scanning probe microscopes, which is known as dynamic mode, involves scanning a cantilever comprising a probe on its free end along the sample surface while causing it to vibrate near its mechanical resonance frequency in the direction toward/away from the sample surface (for example, see patent document 1). For observations using dynamic mode, prior to the observation, it is necessary to measure the resonance frequency of the cantilever to be used and adjust the amplitude and frequency of the signal supplied to the actuator (piezoelectric element) which imparts vibration to the cantilever.

Conventional techniques for measuring the resonance frequency of a cantilever include the method of supplying a fixed amplitude sine wave or square wave signal to the cantilever excitation actuator, varying the frequency, and measuring the amplitude of the cantilever at each frequency. In this case, the measured results are graphically displayed on a display device as an amplitude value (vertical axis) for each frequency (horizontal axis), as illustrated in FIG. 4, the user recognizes the frequency for which the greatest amplitude value was obtained as the resonance frequency based on the graph, and sets that frequency as the cantilever excitation frequency during observation.

PRIOR ART DOCUMENTS

Patent Documents

[Patent document 1] Japanese Unexamined Patent Application Publication 2008-122168

SUMMARY OF THE INVENTION

Problem to be Solved by the Invention

However, there exist various modes with regard to cantilever resonance frequencies, and if too wide a frequency range is used during resonance frequency measurement, it is possible that a frequency not used in observation using a scanning probe microscope will be inadvertently measured as the resonance frequency.

Therefore, in order to reliably measure the necessary resonance frequency, it is necessary to preset a frequency range matching the characteristics of the cantilever and to measure the amplitude of the cantilever while varying the frequency within that range. However, there are various types of cantilevers used in scanning probe microscopes, and the frequency characteristics thereof also vary. Up to now, the user had to obtain information on the cantilever to be used and use the details thereof to appropriately set the frequency range and measure the resonance frequency. However, in cases where information on the cantilever to be used was unknown, in order to measure the resonance frequency, it was necessary to perform measurements while changing the frequency range in a trial-and-error fashion.

The present invention was made in view of such circumstances, and seeks to solve the problem of providing a scanning probe microscope which makes it possible to always measure the resonance frequency in an appropriate frequency range even when information on the cantilever to be used is unknown.

Means for Solving the Problem

To solve the aforementioned problem, the scanning probe microscope of the present invention is a scanning probe microscope wherein a cantilever comprising a probe is installed and is scanned along the surface of a sample while causing the cantilever to vibrate at a frequency near the resonance point by driving with an actuator, thereby obtaining information on the sample surface based on changes in the vibration of the cantilever due to interactions between the sample surface and the probe, the scanning probe microscope being characterized in that it comprises an imaging means which images said cantilever, and a resonance frequency estimation means which estimates the resonance frequency of the cantilever from the cantilever image imaged by the imaging means.

Here, in the present invention, a configuration can be favorably employed, comprising a resonance frequency determination which measures the amplitude at each frequency while varying the excitation frequency of the cantilever imparted by said actuator within a specified frequency range centered on the resonance frequency estimated by said resonance frequency estimation means, and determines the frequency for which the greatest amplitude was obtained as the actual resonance frequency.

In the present invention, a configuration can be employed wherein said resonance frequency estimation means designates portions corresponding to the cantilever length and breadth on the cantilever image imaged by said imaging means and estimates the resonance frequency of said cantilever with an approximation formula using the dimensions of each such portion.

Alternatively, in the present invention, a configuration can be employed wherein said resonance frequency estimation means performs image processing of the cantilever image imaged by said imaging means to determine the length and breadth dimensions thereof and estimates the resonance frequency of said cantilever with an approximation formula using those dimensions.

The present invention seeks to solve the problem by making use of the fact that the frequency characteristics of a cantilever depend on the length and breadth thereof, that an optical microscope is usually included as an auxiliary observation mechanism in scanning probe microscopes of this type, and that the cantilever can be imaged by means of this optical microscope.

Namely, the resonance frequency of a cantilever can be expressed by the known general formula indicated below.

$$f_o = (1/2\pi) \cdot (1.875/L)^2 \cdot \sqrt{(EI/\rho A)} \tag{1}$$

In this formula (1), $f_o$ is the resonance frequency, L is the cantilever length, E is Young's modulus, I is the second moment of area, A is the cross-sectional area of the cantilever, and $\rho$ is density.

Moreover, the optical microscope included as an accessory to scanning probe microscopes is usually able to image the cantilever from directly above, and thus, it is possible to determine the length L and breadth of the cantilever based on the results of imaging of the cantilever by this optical microscope. However, it is not possible to determine thickness from such imaging results.

In formula (1), the parameters for which thickness is required are the second moment of area I and cross-sectional area A. However, although cantilevers used in scanning probe microscopes of this sort can be of various different thicknesses, the differences are not extreme. Thus, for example, if the thickness is assumed to be constant or the same as the breadth to approximate the second moment of area I and the cross-sectional area A, the results obtained will not be extremely deviating values.

Furthermore, in formula (1), the Young's modulus E and density ρ differ depending on the material of the cantilever, but nearly all cantilevers used in scanning probe microscopes of this type are Si. Therefore, if computation is performed according to formula (1) using the values for Si as the Young's modulus E and density ρ, except in special cases, there will not be any major error in the results obtained.

Therefore, it is generally possible to estimate the resonance frequency of the cantilever by determining and substituting in the length and breadth obtained from the image of the cantilever installed on the device using formula (1), for example, as an approximation formula.

Notification of the resonance frequency of the cantilever estimated in this manner may be given to the user by displaying on a display device or the like, or the device may execute the frequency calculation operation automatically.

Namely, the frequency is varied automatically within a specified frequency range centered on the estimated resonance frequency, and the frequency for which the greatest amplitude was obtained is determined to be the resonance frequency.

In the present invention, as the method of determining the length and breadth of the cantilever from the image thereof, one can employ the technique of determining the actual dimensions by designating portions corresponding to the length and breadth of the cantilever on the image or determining the actual length and breadth dimensions through image processing.

Effect of the Invention

According to the present invention, a cantilever is installed and imaged with an imaging means (optical microscope), and the resonance frequency of the cantilever is estimated based on the cantilever image, so even when using a cantilever with unknown frequency characteristics, measurement of the resonance frequency can immediately be performed within an appropriate frequency range. As a result, mistakes regarding the resonance frequency or the need to perform setting and modification of the frequency range through trial and error are eliminated, making it possible to achieve a shortening of the measurement time.

DETAILED DESCRIPTION OF THE EXEMPLARY EMBODIMENTS

An embodiment of the present invention will be described below with reference to the drawings.

Figure 1:
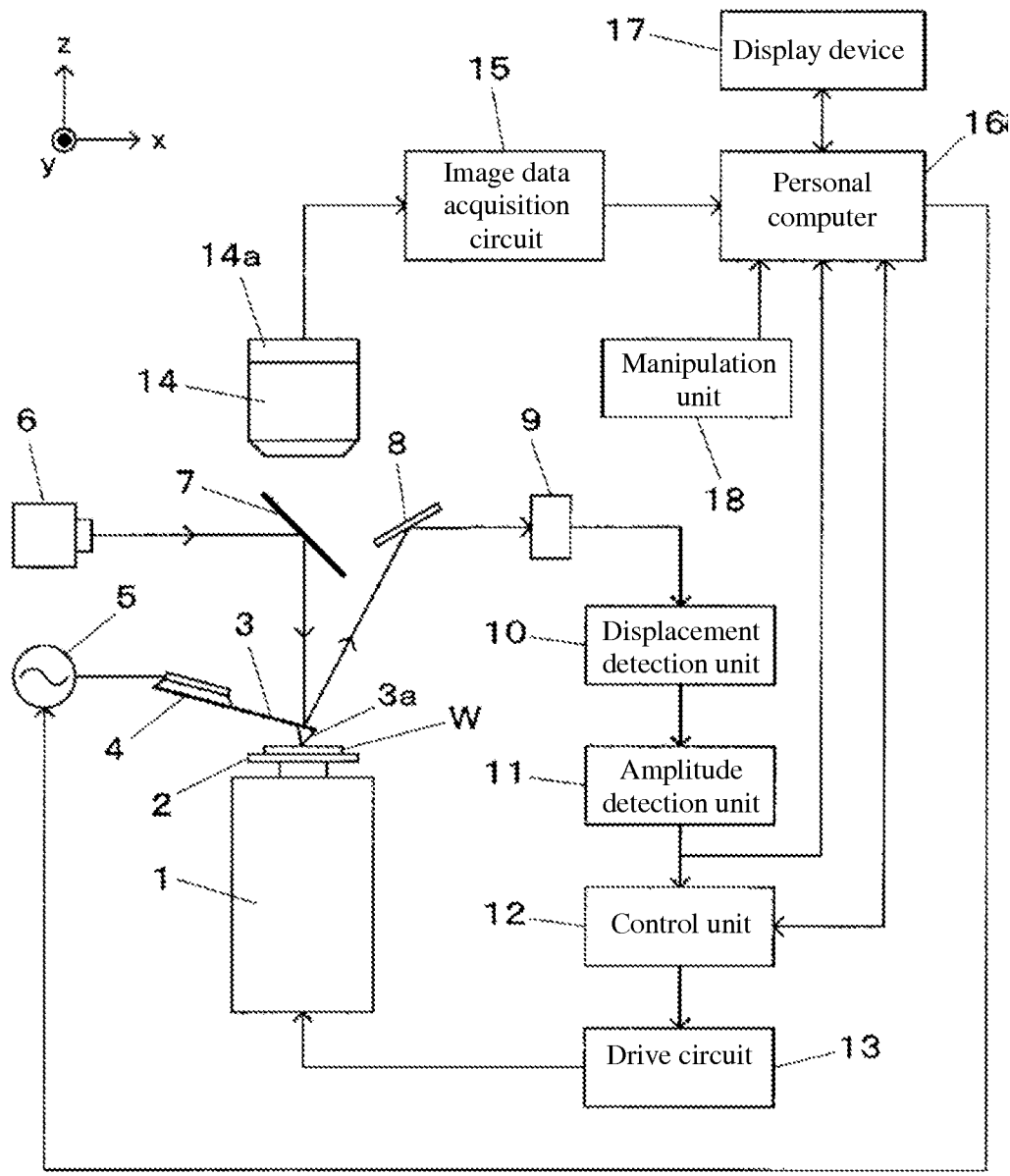
FIG. 1 A diagram of an embodiment of the present invention.

FIG. 1 is a diagram of an embodiment of the present invention, showing a schematic drawing which represents the mechanical configuration along with a block diagram representing the system configuration.

The sample W, which is the object of observation, is held on a sample tray 2 provided over a drive mechanism (scanner) 1 comprising a piezoelectric element, etc. The drive unit 1 is able to move the sample W along its surface in the x and y directions and to slightly move the sample W in the z direction orthogonal to its plane. The drive control signal for this drive mechanism 1 is supplied from a drive circuit 13, described below.

A cantilever 3 with a probe 3a provided at its tip end (free end) is arranged above the sample tray 2. This cantilever 3 is attached to an excitation actuator 4 comprising a piezoelectric element. By applying alternating current voltage to the excitation actuator 4 from an excitation voltage generating circuit 5, vibration is imparted in the direction toward/away from the sample W, that is, the Z direction.

Displacement of the cantilever 3 is detected by a known optical lever type displacement detection mechanism comprising a laser diode 6, beam splitter 7, mirror 8 and light detector 9. Namely, laser light outputted from laser diode 6 is guided to the top surface of the cantilever 3 by the beam splitter 7, and the reflected light is inputted via mirror 8 into light detector 9. The light receiving surface is split in two in the direction of movement of the reflected light due to movement of the cantilever 3 in the z direction, and this light detector 9 can determine the displacement of the cantilever 3 in the z direction based on change in the amount of incident light on each of those light receiving surfaces. The output of this light detector 9 is acquired by displacement detection unit 10, a displacement signal is generated, and that displacement signal is acquired by amplitude detection unit 11.

The amplitude value of the displacement signal is detected from that signal in amplitude detection unit 11. The detection output thereof is acquired by control unit 12. During observation of the sample W, the control unit 12 causes the drive mechanism 1 to move in the z direction via drive circuit 13 so as to keep the detection results for the amplitude value of cantilever 3 from the amplitude detection unit 11 at a constant value. This amount of displacement in the z direction constitutes data which represents surface information for the sample W.

Namely, when attractive force or repulsive force acts between the surface of the sample W and the cantilever 3 vibrating near the resonance frequency, the amplitude of vibration of the cantilever 3 changes. During observation, the control unit 12, while scanning the drive mechanism 1 via drive circuit 13 in the x and y directions, causes the drive mechanism 1 to move in the z direction via drive circuit 13 so as to keep the amplitude of vibration of the cantilever 3 at each position at a constant value. The z-direction movement control signals at each location in the x and y directions, and these signals are fed to a personal computer 16 as surface information for each location on the sample W in the x and y directions, and are displayed on display unit 17 as a surface information image, etc. for the sample W.

Optical microscope 14 is provided as an auxiliary observation mechanism above the drive mechanism 1. This optical microscope 14 has a built-in CCD 14a, the imaging output of which is fed via image data acquisition circuit 15 to personal computer 16. This optical microscope 14 allows auxiliary observation of the surface of the sample W, as well as making it possible to adjust the optical system of the displacement detection mechanism so that the laser spot from the laser diode 6 is correctly positioned on the top surface of the cantilever 3 while observing the top surface of the cantilever 3 with this optical microscope 14.

In the case of observation using dynamic mode, the cantilever 3 is moved in the x and y directions along the surface of the sample W while causing the cantilever 3 to vibrate in the z direction near the resonance point, but prior to such observation, it is necessary to find out the resonance frequency of the cantilever 3 used and to set the oscillation frequency of excitation voltage generating circuit 5 based on that resonance frequency. A distinguishing characteristic of this embodiment lies in the point of having a function for determining the resonance frequency of the cantilever 3, which function is implemented by means of a program installed on personal computer 16.

The content thereof will be described below with reference to the example of a cantilever imaging screen on display device 17 shown in FIG. 2 and the flow chart representing the cantilever resonance frequency estimation and determination procedure shown in FIG. 3.

Figure 2:
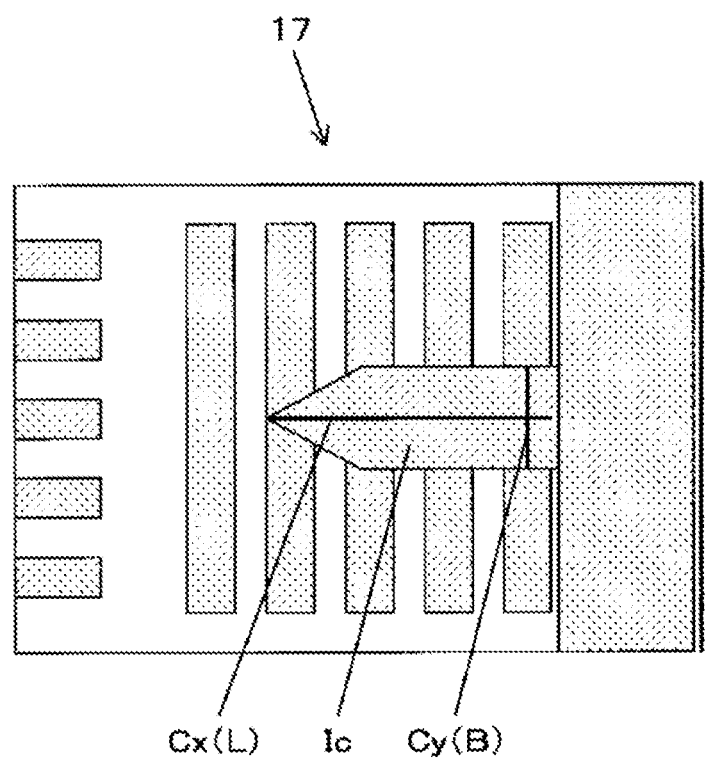
FIG. 2 A drawing showing an example of a cantilever image imaged with an optical camera.
Figure 3:
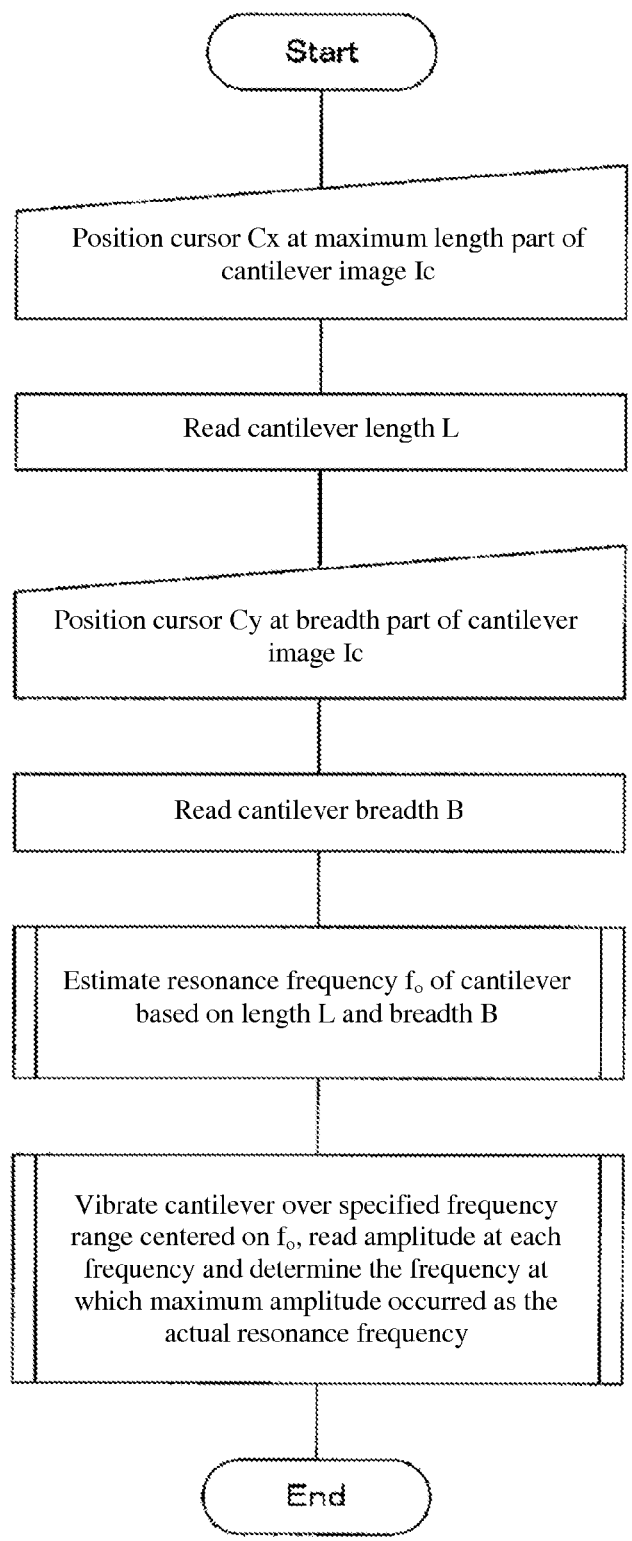
FIG. 3 A flow chart illustrating the procedure for estimating and determining the resonance frequency of a cantilever in an embodiment of the present invention.
Figure 4:
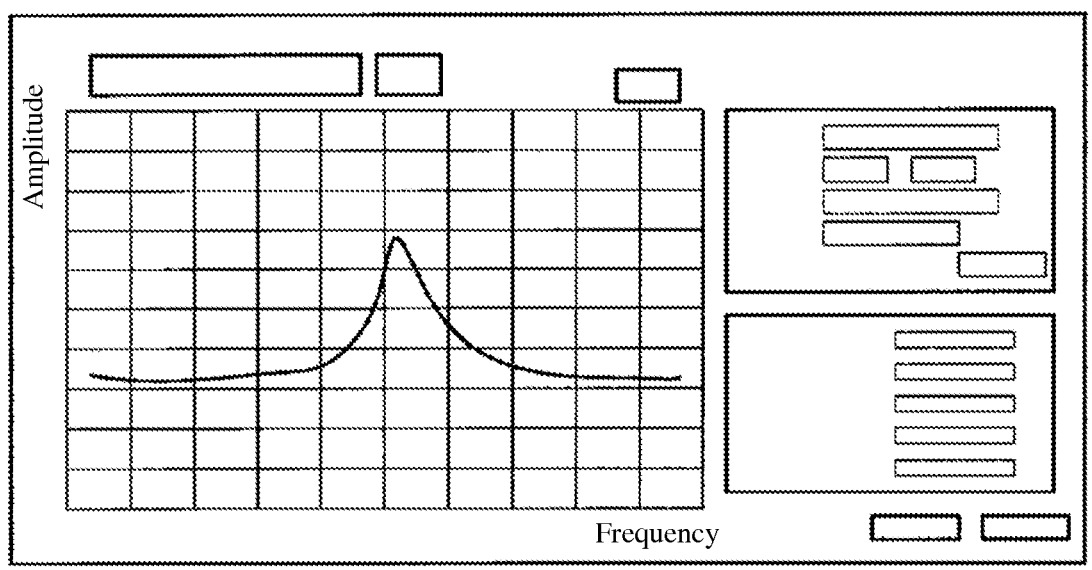
FIG. 4 A drawing showing an example of graph display of amplitude measurement results in relation to cantilever excitation frequency change.

First, the cantilever 3 is imaged using the optical microscope 14 shown in FIG. 1, and with the cantilever image being displayed on display device 17, line segments Cx and Cy are drawn on the cantilever image Ic in the portions corresponding to the length and breadth of the cantilever, as shown in FIG. 2, by manipulating the cursor with a mouse or the like of manipulation unit 18 of personal computer 16. As a result, the personal computer 16 reads the length L and breadth B of the actual dimensions of the cantilever 3 based on the pixel count of the lengths of those line segments Cx and Cy and the known imaging magnification ratio of the optical microscope 14.

Next, using the length L and breadth B which have been read, the resonance frequency $f_o$ of the cantilever 3 is estimated, for example, using aforementioned formula (1). Here, the thickness of the cantilever 3 is unknown, but it is assumed to be a preset specified value and the second moment of area I and cross-sectional area A in formula (1) are determined based on that assumed value and the breadth B; furthermore, the material is unknown, but it is assumed to be Si for determining the Young's modulus E and density ρ in formula (1), after which the resonance frequency $f_o$ is determined using formula (1).

Then, a drive command is given to the excitation voltage generating circuit 5 to actually excite the cantilever 3 in the specified frequency range centered on the estimated resonance frequency $f_o$. During this excitation, the amplitude value at each vibration frequency is read from the amplitude detection unit 11, the frequency at which the greatest amplitude value was obtained is determined to be the actual resonance frequency $f_r$ of the cantilever 3, and is displayed on display device 17 to notify the user.

Therefore, with the embodiment of the present invention, the user only images the cantilever with the optical microscope 14 and draws the line segments Cx and Cy at the length and breadth portions by manipulating a cursor over the cantilever image Ic on the imaging screen, after which the resonance frequency can be found out automatically, so even if the frequency characteristics of the cantilever 3 are unknown, it is possible to quickly ascertain the resonance frequency thereof and perform adjustments for observation.

Here, in the foregoing embodiment, an example was presented in which line segments Cx, Cy were drawn on the cantilever image Ic, and the actual dimensions were determined based on the length of those line segments, but it is also possible to perform image processing on the image of cantilever 3 generated by the optical microscope 14 and automatically recognize the length and breadth portions on the image and convert them to the actual dimensions.

Furthermore, in the foregoing embodiment, an example was presented wherein, based on the estimated resonance frequency $f_o$, a vibration test was automatically performed in a specified frequency range centered on that resonance frequency to determine the actual resonance frequency $f_r$, but for the present invention, it suffices to just notify the user regarding the estimated resonance frequency $f_o$.

DESCRIPTION OF REFERENCE SYMBOLS

1 Drive mechanism
2 Sample tray
3 Cantilever
4 Excitation actuator
5 Excitation voltage generating circuit
6 Laser diode
7 Beam splitter
8 Mirror
9 Light detector
10 Displacement detection unit
11 Amplitude detection unit
12 Control unit
13 Drive circuit
14 Optical microscope
14a CCD
15 Image data acquisition circuit
16 Personal computer
17 Display device
18 Manipulation unit
W Sample

What is claimed:

1. A scanning probe microscope, wherein a cantilever comprising a probe is installed and is scanned along the surface of a sample while causing the cantilever to vibrate at a frequency near the resonance point by driving with an actuator, thereby obtaining information on the sample surface based on changes in the vibration of the cantilever due to interactions between the sample surface and the probe, the scanning probe microscope comprising
   an imaging means which images said cantilever to provide a cantilever image, and
   a resonance frequency estimation means which estimates the resonance frequency of the cantilever from the cantilever image imaged by the imaging means.

2. The scanning probe microscope as described in claim 1, further comprising
   a resonance frequency determination means that measures the amplitude at each frequency while varying the excitation frequency of said cantilever imparted by said actuator within a specified frequency range centered on the resonance frequency estimated by said resonance frequency estimation means, and determines the frequency for which the greatest amplitude was obtained as the actual resonance frequency.

3. The scanning probe microscope as described in claim 1, wherein said resonance frequency estimation means designates portions corresponding to the cantilever length and breadth on the cantilever image imaged by said imaging means and estimates the resonance frequency of said cantilever with an approximation formula using the dimensions of each such portion.

4. The scanning probe microscope as described in claim 1, wherein said resonance frequency estimation means performs image processing of the cantilever image imaged by said imaging means to determine the length and breadth dimensions thereof and estimates the resonance frequency of said cantilever with an approximation formula using those dimensions.

5. The scanning probe microscope as described in claim 2, wherein said resonance frequency estimation means designates portions corresponding to the cantilever length and breadth on the cantilever image imaged by said imaging means and estimates the resonance frequency of said cantilever with an approximation formula using the dimensions of each such portion.

6. The scanning probe microscope as described in claim 2, wherein said resonance frequency estimation means performs image processing of the cantilever image imaged by said imaging means to determine the length and breadth dimensions thereof and estimates the resonance frequency of said cantilever with an approximation formula using those dimensions.

7. The scanning probe microscope as described in claim 3, wherein said resonance frequency estimation means performs image processing of the cantilever image imaged by said imaging means to determine the length and breadth dimensions thereof and estimates the resonance frequency of said cantilever with an approximation formula using those dimensions.

8. A method of estimating the resonance frequency of a cantilever including a probe using a scanning probe microscope, comprising:
    scanning the probe along a surface of a sample while causing the cantilever to vibrate at a frequency near the resonance point by driving the cantilever with an actuator, thereby obtaining information on the sample surface based on changes in the vibration of the cantilever due to interactions between the sample surface and the probe,
    imaging said cantilever to provide a cantilever image, and
    estimating the resonance frequency of the cantilever from the cantilever image.

9. The method as described in claim 8, further comprising
    measuring the amplitude at each frequency while varying the excitation frequency of said cantilever imparted by said actuator within a specified frequency range centered on the resonance frequency estimated by said resonance frequency estimation means, and determining the frequency for which the greatest amplitude was obtained as the actual resonance frequency.

10. The method as described in claim 8, further comprising
    designating portions corresponding to the cantilever length and breadth on the cantilever image, and
    estimating the resonance frequency of said cantilever with an approximation formula using the dimensions of each such portion.

11. The method as described in claim 8, further comprising
    performing image processing of the cantilever image to determine the length and breadth dimensions thereof and
    estimating the resonance frequency of said cantilever with an approximation formula using those dimensions.

12. The method as described in claim 9, further comprising
    designating portions corresponding to the cantilever length and breadth on the cantilever image, and
    estimating the resonance frequency of said cantilever with an approximation formula using the dimensions of each such portion.

13. The method as described in claim 9, further comprising
    performing image processing of the cantilever image to determine the length and breadth dimensions thereof and
    estimating the resonance frequency of said cantilever with an approximation formula using those dimensions.

14. The method as described in claim 10, further comprising
    performing image processing of the cantilever image to determine the length and breadth dimensions thereof and
    estimating the resonance frequency of said cantilever with an approximation formula using those dimensions.

\* \* \* \* \*